United States Patent [19]

Naruse et al.

[11] Patent Number: 4,847,631

[45] Date of Patent: Jul. 11, 1989

[54] CHARGE AND DEFLECTION CONTROL TYPE INK JET PRINTER

[75] Inventors: Osamu Naruse, Yokohama; Sadao Kakeno, Fujisawa; Chuji Ishikawa, Yokohama; Satoshi Sekimoto, Tokyo; Masanori Horike, Yokohama, all of Japan

[73] Assignee: Ricoh Company, Ltd., Tokyo, Japan

[21] Appl. No.: 73,162

[22] Filed: Jul. 14, 1987

[30] Foreign Application Priority Data

| | | | |
|---|---|---|---|
| Jul. 16, 1986 | [JP] | Japan | 61-167335 |
| Jul. 17, 1986 | [JP] | Japan | 61-168293 |
| Jul. 22, 1986 | [JP] | Japan | 61-172325 |

[51] Int. Cl.[4] .................... G01D 15/18

[52] U.S. Cl. .................... 346/75; 346/140 R

[58] Field of Search .................... 346/75, 140 R

[56] References Cited

U.S. PATENT DOCUMENTS

| | | | |
|---|---|---|---|
| 4,240,081 | 12/1980 | Devitt | 346/75 |
| 4,366,490 | 12/1902 | De Bonte et al. | 346/140 R |
| 4,617,574 | 10/1986 | Millet et al. | 346/75 |
| 4,639,736 | 1/1987 | Jochimsen | 346/75 |

*Primary Examiner*—E. A. Goldberg
*Assistant Examiner*—Gerald E. Preston
*Attorney, Agent, or Firm*—Oblon, Fisher, Spivak, McClelland & Maier

[57] ABSTRACT

A charge and deflection control type ink jet printer in which at least an ink jet head section, a charging section and a deflecting section are configured in a single replaceable module, or unit. The user of the printer may replace the module without the help of a serviceman. The replaceable unit is further provided with an ink ejection adjusting mechanism, a deflection efficiency adjusting device, an a drive efficiency adjusting device.

16 Claims, 7 Drawing Sheets

FIG. 8
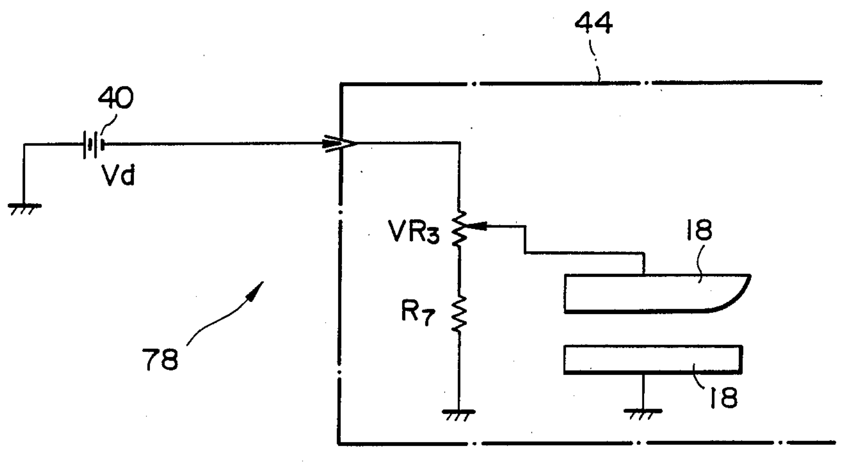
FIG. 10
FIG. 9
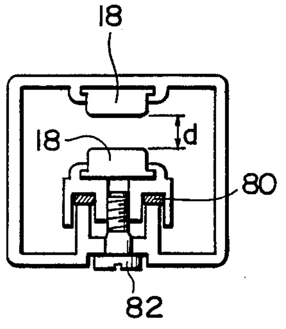
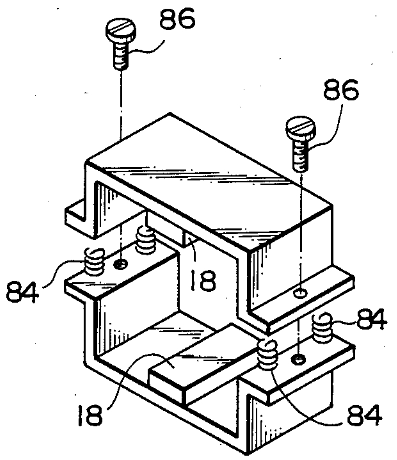

CHARGE AND DEFLECTION CONTROL TYPE INK JET PRINTER

BACKGROUND OF THE INVENTION

The present invention relates to a charge and deflection control type ink jet printer and, more particularly, to such a type of ink jet printer in which an ink jet head section, a charging section and a deflecting section are configured in a single module, or unit, which may be replaced by a user, thereby enhancing the ease of maintenance.

An ink jet printer of the type described usually includes an ink jet head, a charging electrode, deflecting electrodes, a gutter, pumps, an ink reservoir, and others. As well known in the art, an ink drop to print out information is charged by the charging electrode in response to a charge signal and, then, deflected by the deflecting electrodes on the basis of the amount of charge so as to impinge on a paper. On the other hand, an ink drop not to print out information is caused to fly straightforward without being deflected, then caught by the gutter, then collected in the ink reservoir by the pump, and then returned to the ink jet head to be used again.

In the prior art ink jet printer having the above construction, the ink jet head, the deflection electrodes, the gutter and others are arranged at remote positions from each other on a carriage. This bring about a problem that every time defective print-out occurs due to stopping of a nozzle of the ink jet head, deposition of dust particles on the charging and deflecting electrodes, and/or solidification of ink, which are mostly frequently encountered with an ink jet printer of the type described, a serviceman has to be sent for to take an appropriate measure such as repair or replacement. Especially, in the event of replacement of the head whose nozzle is stopped up, a serviceman needs to adjust and set up the direction of ejection with respect to the height and width of the gutter and the drive voltage, which differ from one head to another.

Japanese Patent Publication No. 55-47595 discloses a charge and deflection control type ink jet printer in which pumps, an ink jet head, deflection electrodes and other parts are interconnected by tubes and leads. A drawback with this kind of ink jet printer is that when the printer becomes inoperable due to clogging of the head, contamination of the electrodes, and other causes, it is impossible for the user to replace the parts or to perform maintenance without the help of a serviceman.

SUMMARY OF THE INVENTION

It is therefore an object of the present invention to provide a charge and deflection control type ink jet printer whose ink jet head section, charging electrode section, and gutter section are configured in a single replaceable module, or unit, for promoting maintenance by a user.

It is another object of the present invention to provide an ink jet printer of the type described in which at least a head unit and an electrode unit are assembled in a single replaceable module, or unit, so that the deflection efficiency may be adjusted to uniformize the height of characters, the lines, and others.

It is another object of the present invention to provide an ink jet printer of the type described in which at least a head unit and an electrode unit are assembled to constitute a single replaceable module, or unit, so that the drop-producing efficiency, or driving efficiency, of the head is enhanced.

It is another object of the present invention to provide a generally improved ink jet printer of the type described.

In accordance with the present invention, in a charge and deflection control type ink jet printer in which a part of structural parts are configured in a single replaceable module, the module comprises at least two of an ink jet head, a charging electrode, deflecting electrodes, and a gutter.

Alternatively, the module may comprise a charge and deflection unit, an ink jet head unit, and a deflection efficiency adjusting means for maintaining deflection efficiency constant.

The above and other objects, features and advantages of the present invention will become apparent from the following detailed description taken with the accompanying drawings.

BRIEF DESCRIPTION OF THE DRAWINGS

FIG. 8 is a circuit diagram showing a deflection level adjusting mechanism;

FIGS. 9 and 10 are views each showing another specific construction of the deflection level adjusting mechanism;

DESCRIPTION OF THE PREFERRED EMBODIMENTS

Figure 1:
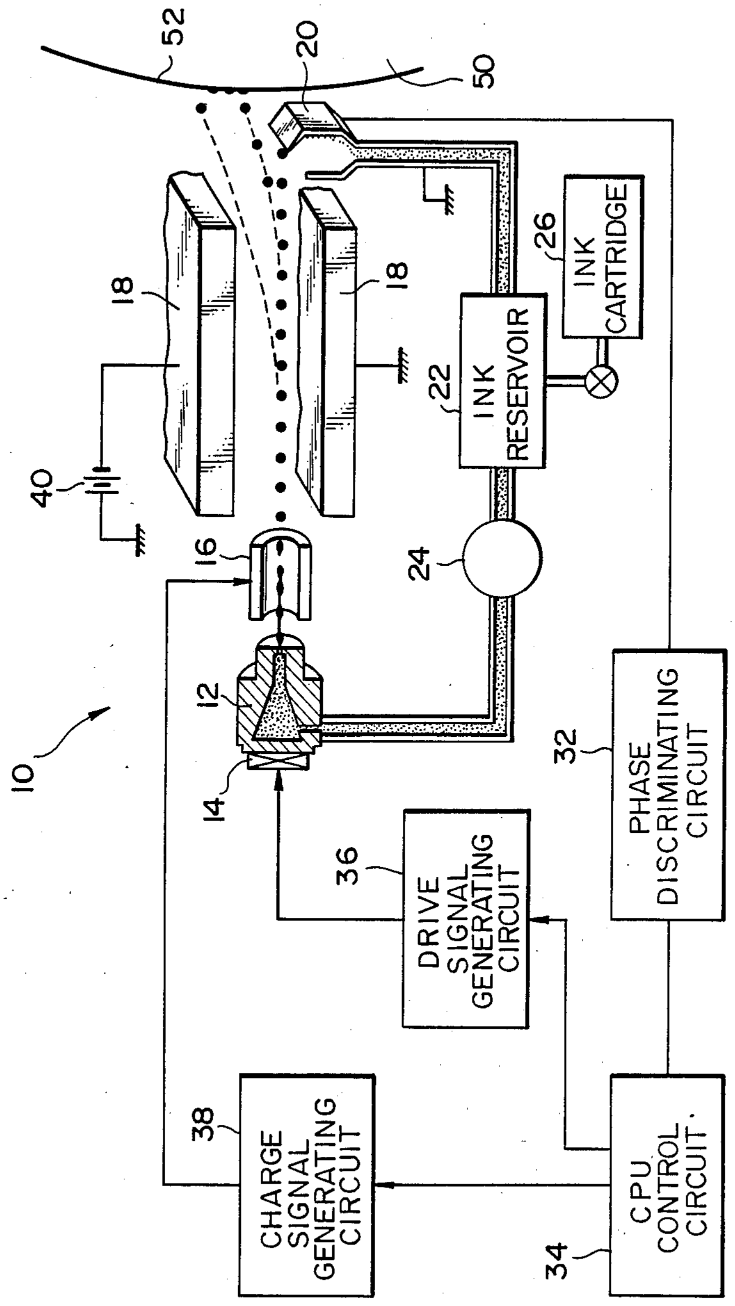
FIG. 1 is a system diagram of a charge and deflection control type ink jet printer to which the present invention is applicable.
Figure 2:
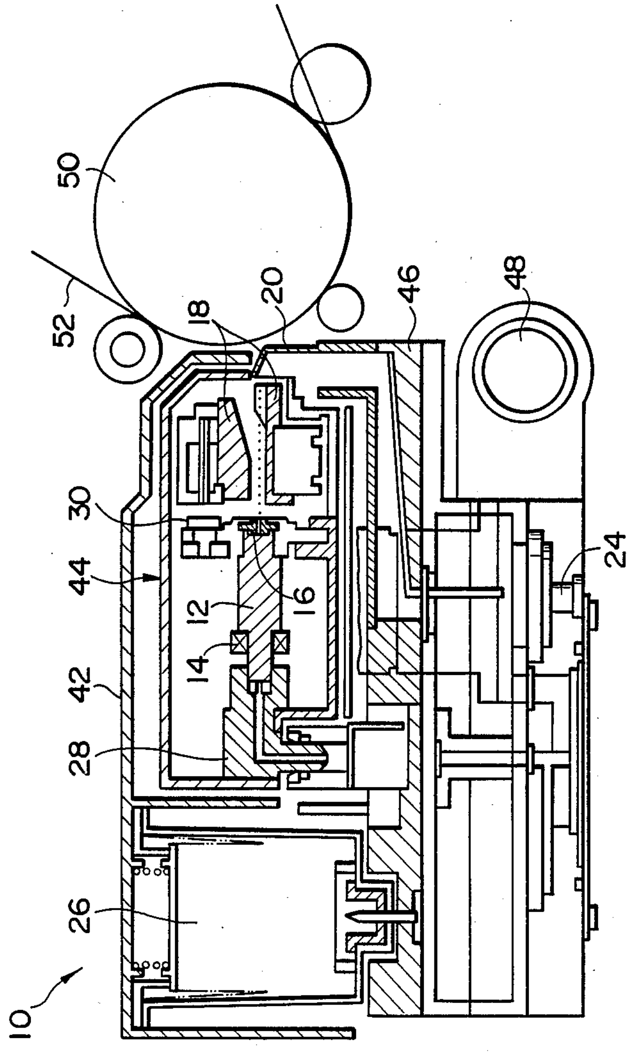
FIG. 2 is a sectional side elevation of a charge and deflection control type ink jet printer embodying the present invention.

Referring to FIG. 1 of the drawings, a charge and deflection control type ink jet printer to which the present invention is applicable is shown in a schematic system diagram and generally designated by the reference numeral 10. FIG. 2 shows the ink jet printer 10 in a sectional side elevation. As shown, the ink jet printer 10 comprises an ink jet head 12, a piezoelectric vibrator 14, a charging electrode 16, deflecting electrodes 18, a gutter 20, an ink reservoir 22, a compressing reservoir 24, an ink cartridge 26, an ink supply joint 28, an ink jet adjusting mechanism 30, a phase discriminating circuit 32, a CPU control circuit 34, a drive signal generating circuit 36, a charge signal generating circuit 38, a deflection power source 40, a carriage cover 42, and a replaceable unit case 44 which constitutes a head module. Specifically, the replaceable unit 44 accommodates at least the head 12, charging electrode 16, deflecting electrodes 18, vibrator 14, and gutter 20. The unit 44 is enclosed by the carriage cover 42. The reference numeral 46 designates a top plate of a carriage, 48 a shaft of the carriage, 50 a platen, and 52 a paper.

In operation, an ink drop to print out information, or print drop, is charged by the charging electrode 16 in response to a charge signal and, then, deflected by the deflecting electrode 18 based on the amount of charge so as to impinge on the paper 52. On the other hand, an ink drop not to print out information, or non-print drop, is caused to fly straightforward without being charged, then collected in the ink reservoir 22 by the gutter 20, and then compressed by the compressing reservoir 24 to be returned to the ink jet head 12. Such a sequence of steps are well known in the art.

Figure 3:
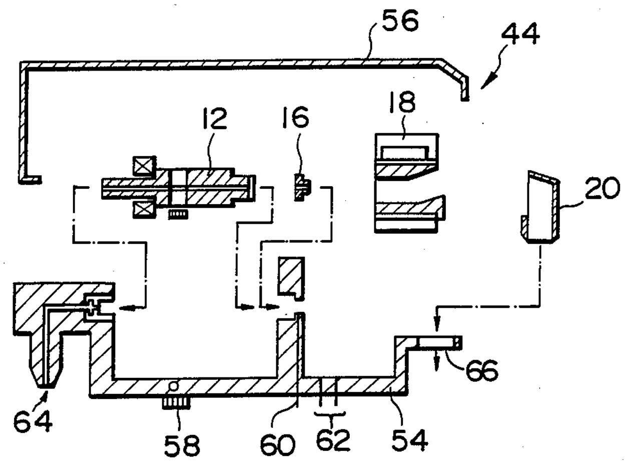
FIG. 3 is an exploded view of a replaceable unit case in accordance with the present invention.
Figure 4:
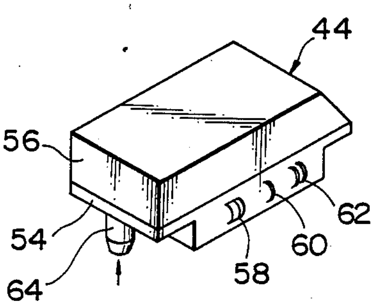
FIGS. 4 and 5 are perspective view each showing a specific construction of the replaceable unit case in accordance with the present invention.
Figure 5:
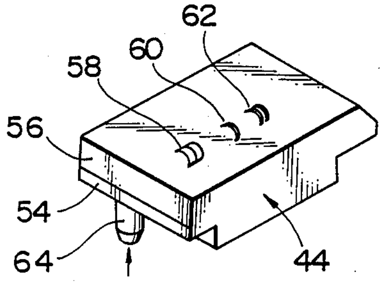

Referring to FIG. 3, the replaceable unit case, or head module, 44 generally comprises a unit base, or module base, 54, and a unit cover, or module cover, 56. The module base 54 is loaded with a head drive terminal 58, a charging electrode terminal 60, and deflecting electrode terminal 62, and is provided with an ink inlet port 64 and an ink collection port 66. As shown, the unit case 44 accommodates the head 12, charging electrode 16, deflecting electrode 18 and gutter 20 which are assembled with the module base 54 as a reference. The unit case 44 is enclosed by the module cover 56 to prevent dust, mist and other impurities from entering the unit case 44. Having such a configuration, the unit case 44 is connectable by one manipulation, i.e., without resorting to independent connection of the hydraulic and electrical systems. FIGS. 4 and 5 show, respectively, a case wherein the terminals for electrical connection 58, 60 and 62 are provided on the side of the head module 44, and a case wherein they are provided on the top of the head module 44. Any of the configurations shown in FIGS. 4 and 5 allows the direction of connection of the hydraulic and electrical systems to be changed to eliminate short-circuiting due to the fall of ink, which may occur at the time of loading and unloading of the head module 44.

As described above, in accordance with this embodiment, the direction of ink ejection and the head drive voltage are adjusted within the replaceable unit case, or module. Hence, when defective print-out is caused by stopping of a nozzle, not shown, or the deposition of dust, the user is capable of restoring the printer to normal simply by replacing the unit case 44, i.e., without the need for a serviceman call.

Figure 6:
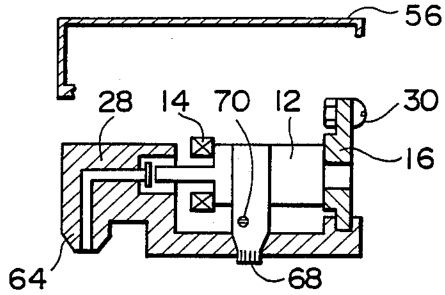
FIG. 6 is a sectional side elevation showing another specific construction of the replaceable unit case in accordance with the present invention.

Referring to FIG. 6, another embodiment of the present invention is shown. The head module 44 in accordance with this embodiment is connectable simply by inserting it with the ink inlet port 64 facing downward. A connector 68 allows the electrical signal system to be automatically connected when the head module 44 is inserted. The direction of ejection is adjusted beforehand by a checking step which is performed before shipping. Further, the head drive voltage is adjusted beforehand by manipulating a volume 70 which is provided on the head module 44. The head module 44 having such a construction needs no adjustment at the time of replacement and, therefore, it can be replaced by the user without the help of a serviceman. It is to be noted that in this particular embodiment the charging electrode 16 is not loaded in the head module 44 in order to minimize the number of parts to be replaced.

In an ink jet printer of the type shown in FIG. 2, the height of characters fluctuates over a substantial range and, therefore, has to be adjusted at the time of replacement of the unit case 44. Basically, the deflection height XD of an ink drop is expressed as:

$$XD = K\frac{Q}{mV^2}\cdot\frac{Vd}{d}$$

where Q is the amount of charge determined by the charge voltage Vc and the electrode conditions, m is the mass of an ink drop, V is the velocity of flight of an ink drop, Vd is the deflection voltage, d is the distance between the deflecting electrodes, and K is a constant which is determined by the other conditions. It follows that a change of any of such parameters directly translates into a change of deflection efficiency.

Hereinafter will be described adjusting mechanisms in accordance with the present invention which are built in the unit case 4 for maintaining the deflection efficiency constant to adjust the character height.

Figure 7:
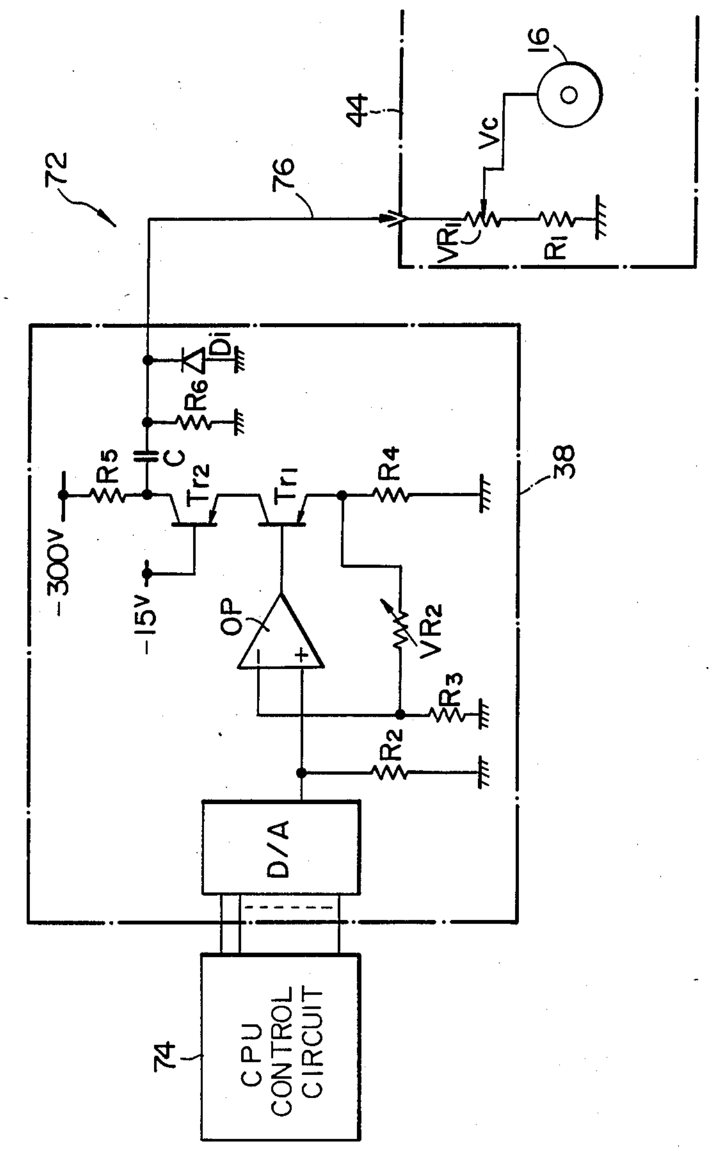
FIG. 7 is a circuit diagram showing a charge level adjusting mechanism.

Referring to FIGS. 7 and 8, there are shown, respectively, an adjusting device for changing the charge voltage level, and an adjusting device for changing the deflection voltage level. As shown in FIG. 7, the adjusting device 72 includes a CPU control circuit 74, the charge signal generating circuit 38, a carriage cable 76, and the replaceable unit case 44. The charge signal generator 38 functions to control a digital-to-analog (D/A) converted input code in response to character print-out data, thereby producing a charge signal in which the peak of pulses is variable. The output of the charge signal generator 38 is variable by a variable resistor, or volume $VR_1$ which is installed in the unit 44, whereby the voltage Vc applied to the charging electrode 16 is adjusted in terms of level. For example, assuming that the maximum output of the charge signal generator 38 is 380 volts, and that the resistance set up by the volume $VR_1$ is 200 kΩ and the resistance of a resistor $R_1$ is 820 kΩ, then the voltage applied to the charging electrode 16 is 342±38 V, i.e., the voltage is variable by approximately ±10%. Hence, the deflection efficiency of individual units 44 can be controlled beforehand to a predetermined one, i.e., a predetermined character height can be set up at the time of replacement. To further enhance the accuracy and, thereby, the quality of printing, the output of the circuit 38 may be controlled beforehand to a predetermined value. While the scattering of the circuit output derives from those of the circuit parts and elements, in this particular embodiment, it is adjusted by a volume, or variable resistor $VR_2$. In operation, the D/A output current is converted into a voltage by a resistor $R_2$ and, then, amplifier by an operational amplifier (OP) and a transistor $Tr_1$. At this instant, the voltage across a resistor $R_4$ is fed back by a feedback circuit which is made up of the volume $VR_2$ and a resistor $R_3$, thereby eliminating scattering. The output of the transistor $Tr_1$ is amplified by a transistor $Tr_2$ and a resistor $R_5$ to become a high-voltage pulse. This pulse is routed through a clamp circuit which comprises a capacitor C, a resistor $R_6$ and a diode Di, so as to provide a stable pulse which is free from DC drift.

Referring to FIG. 8, the device for adjusting the defletion voltage Vd, generally 78, is installed in the replaceable unit 44. In this embodiment, assuming that the deflection voltage Vd is 3500 V by way of example, a voltage of 3340±160 V may be applied across the deflection electrodes 18 by selecting the resistance $VR_3$ to be 100 MΩ and a resistance $R_7$ to be 10 MΩ, meaning that the voltage is adjustable by approximately 4.8 percent.

FIGS. 9 and 10 each shows another embodiment of the present invention. While the embodiment of FIG. 8 adjusts the amount of deflection by changing the deflection voltage Vd, the embodiments of FIGS. 9 and 10 adjust the field intensity by changing the distance d between the deflection electrodes. Adjusting the inter-electrode distance d for the deflection voltage Vd causes the field intensity Vd/d to be adjusted, so that the deflection efficiency is proportional to the field intensity. In the embodiment shown in FIG. 9, there are provided an O ring 80 and an adjusting screw 82; the position of the lower deflecting electrode 18 is adjustable utilizing the resiliency of the O ring 80. On the other hand, the embodiment of FIG. 10 includes springs 84 and adjusting screws 86; the position of the upper deflecting electrode 18 is adjustable utilizing the resiliency of the springs 84.

In an ink jet printer of the type shown in FIG. 2, the drop-forming efficiency differs from one head to another due to the scattering of the dimensions of head bodies, the degree of adhesion of piezoelectric vibrators, the scattering of nozzle diameters, etc. On the other hand, a region where no minute particles are produced, i.e., a no-satellite region has to be used in printing out information. It is therefore necessary that the level of drive voltage applied to the piezoelectric vibrator (usually a sinusoidal wave) be adjusted head by head to substantially the center of the no-satellite region. In this condition, it would be convenient to provide the replaceable units 44 with compatibility so as to allow the drive voltage to be adjusted at the time of replacement of the unit 44.

A device for adjusting the drive voltage as stated above in accordance with the present invention will be described.

Figure 11:
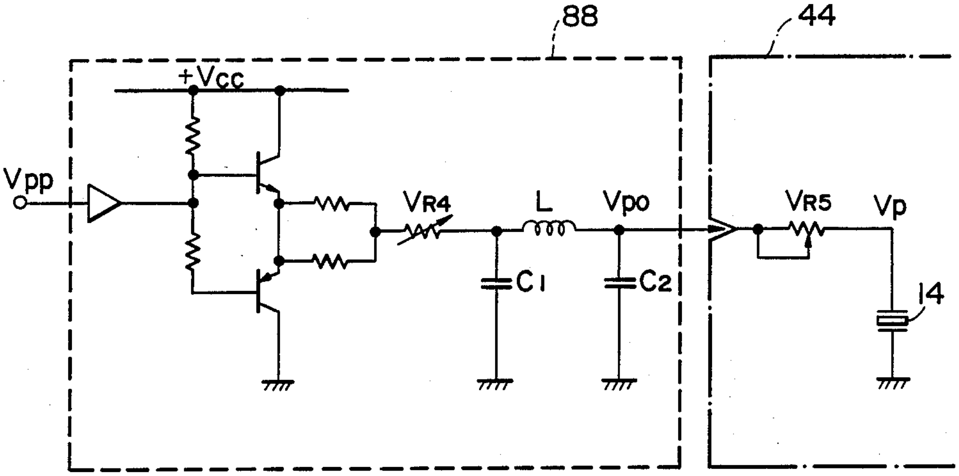
FIG. 11 is a circuit diagram showing a drive efficiency adjusting device.

Referring to FIG. 11, there are shown the replaceable unit 44 and a driving circuit 88 in accordance with this embodiment. If the voltage level applied to the unit 44 is controlled to a predetermined value Vpo by a variable resistor $VR_4$ installed in the driving circuit 88, the voltage Vpo will be maintained constant with accuracy. For example, assuming that the capacity Cp of the piezoelectric vibrator 14 is 250 pF and the resistance of a variable resistor $VR_5$ is 20 kΩ, a variable range of Vp of 12 to 60 Vpp is attainable when the voltage supplied to the unit Vpo is 60 Vpp. Such a variable range is sufficient for the scattering of drive efficiency to be absorbed. It is to be noted that the variable resistor $VR_5$ may be replaced with a variable capacitor. The driving circuit 88 is so constructed as to raise the voltage of the clock input to ±Vcc and, then, extract its basic wave component by a resonance circuit, which is made up of a capacitor $C_1$, an inductance L and a capacitor $C_2$.

Figure 12:
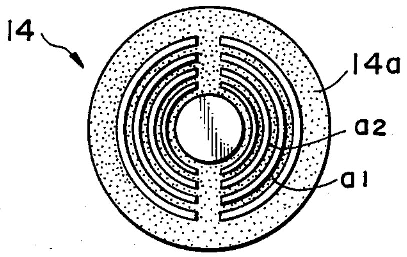
FIG. 12 is a view of an electrode surface of a piezoelectric vibrator.

FIG. 12 shows an electrode surface which may be provided on one or both sides of the piezoelectric vibrator 14. As shown, the electrode surface includes a silver-paradium pole section. To adjust the efficiency, the area of the electrode may be reduced by cutting $a_1$ and $a_2$ by laser trimming.

Figure 13:
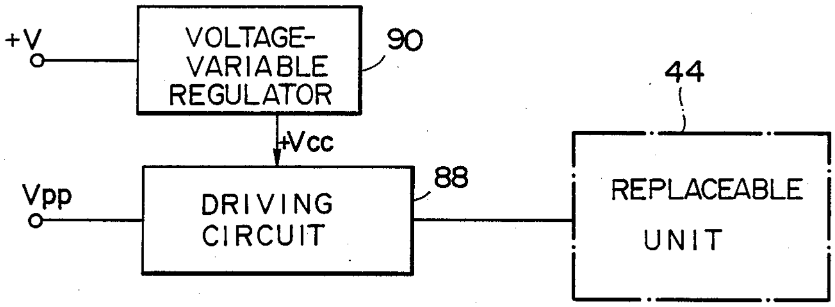
FIG. 13 is a diagram showing a circuit for varying the voltage which is applied to the replaceable unit.

FIG. 13 shows a circuit for rendering the voltage applied to the replaceable unit 44 variable in order to enhance the accuracy. Specifically, the output voltage Vpp of the driving circuit 88 is controlled to a predetermined one by a voltage-variable regulator 90, thereby improving the accuracy.

Figure 14:
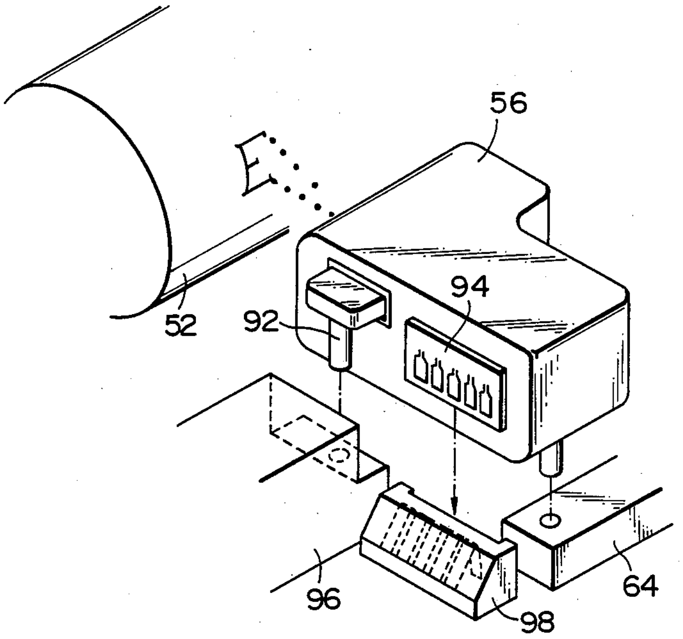
FIG. 14 is a perspective view showing another specific construction of the replaceable unit.

Referring to FIG. 14, an arrangement provided in the vicinity of the replaceable unit case 44 and representative of another embodiment of the present invention is shown. The unit cover, or module cover, 56 made of conductive plastic or painted for conduction is provided with an input pin 92 to a high-tension electrode, and FPC terminals 94 which are individually assigned to head drive voltage, charge voltage, deflection voltage, etc. The reference numeral 96 designates a high-tension power source, 98 a connector, 64 the previously stated ink passageway, and 52 the paper which is wrapped around a platen. As shown, the various parts of this replaceable unit are arranged on the side of the unit cover 56 because arranging contact portions on the underside of the unit cover 56 is undesirable in consideration of possible leakage of ink and other troubles. While such parts may naturally be provided on the top of the unit cover 56, such would need a closure member and, therefore, add to the overall height of the unit.

Figure 15:
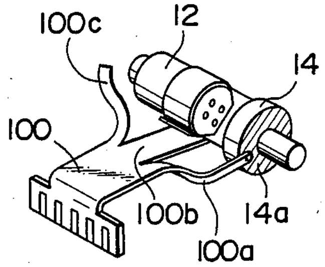
FIG. 15 is a perspective view of still another embodiment of the replaceable unit.

Referring to FIG. 15, a further embodiment of the present invention is shown. In FIG. 15, the reference numeral 12 designates the head, 14 the piezoelectric vibrator, and 100 an FPC. As shown, the FPC 100 includes a portion to be connected to one terminal of a piezoelectric terminal, a portion 100*b* to be connected to a terminals, which is connected to the other terminal of the piezoelectric terminal, a terminal of a sensor responsive to the temperature of the body of the head 12, and a terminal for applying power to a heater of the head body, and a portion 100c to be connected to the terminal of the charging electrode.

Figure 16:
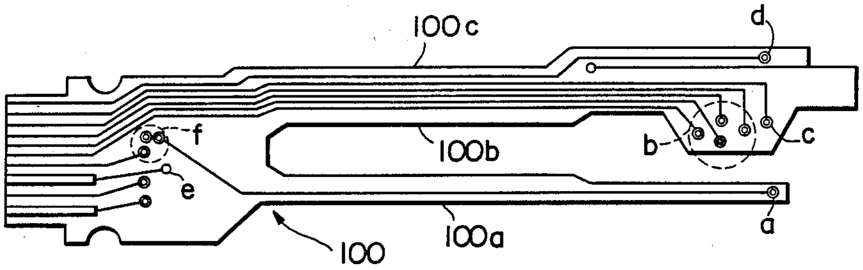
FIG. 16 is a developed enlarged view of an FPC as shown in FIG. 15.

Specifically, as shown in detail in FIG. 16, the FPC 100 includes a terminal a connecting to one terminal of the piezoelectric vibrator 14, terminals b connecting to a heater, a temperature sensor and others, a terminal c connecting to the other terminal of the vibrator 14 via a pattern which is provided in the head body, a terminal d connecting to the charging electrode 16, a terminal e connecting to ground for shielding the case, and a terminal f connecting to the variable resistor $VR_5$, FIG. 11, adapted for the adjustment of drive efficiency. All the machines share the same level of drive voltage (e.g. 60 Vpp) which is applied to the replaceable unit 44. The voltage level actually applied to the piezoelectric vibrator is variable depending upon the particular drop-forming efficiency.

In summary, it will be seen that in accordance with the present invention a user is allowed to replace parts of a head of an ink jet printer with ease when stopping of a nozzle of the head and/or a change in the direction of ejection, which are the most frequent troubles, occurs.

Further, in accordance with the present invention, replaceable units are provided with compatibility to promote the ease of replacement and, thereby, to insure high printing quality. Such makes it possible for the user to restore the printer to normal even when dust particles are deposited on electrodes of the head, as is inherently encountered with an ink jet printer.

In addition, the present invention guarantees easy replacement of the unit and, thereby high printing quality.

Various modifications will become possible for those skilled in the art after receiving the teachings of the present disclosure without departing from the scope thereof.

What is claimed is:

1. An ink jet printer having a charge and deflection control system, said ink jet printer comprising:

an ink supply means having an output connector;

a printer head module comprising a print head means, a charging electrode means, a deflecting electrode means, a gutter, an electrical input connector and a ink input connector;

a control means for controlling the operation of said printer head means, said charging electrode means and said deflecting electrode means wherein said control means is connected to said module by engaging said electrical input and output connectors;

wherein said ink supply is provided by engaging said ink input and output connectors and wherein the removal and replacement of said printer head module is accomplished by the alignment of said electrical connectors and said ink connectors in a single manipulation.

2. An ink jet printer as claimed in claim 1, wherein the module further comprises a module cover and a module base.

3. An ink jet printer as claimed in claim 2, wherein the module base of the module is provided with an ink inlet port and an ink collection port which leads to a gutter, said ink inlet port and collection port being both directed downward.

4. An ink jet printer as claimed in claim 1, wherein the module further comprises an ink ejection adjusting mechanism for adjusting a position of ink ejection of the ink jet head relative to the charging and deflection electrodes and gutter.

5. An ink jet printer as claimed in claim 4, wherein the module further comprises a connector for picking up electrical signals for driving and controlling the temperature of the ink jet head.

6. The printer according to claim 1 wherein said module further comprises a deflection efficiency adjusting means for maintaining deflection efficiency constant.

7. An ink jet printer as claimed in claim 6, wherein the deflection efficiency adjusting means comprises an adjusting means for changing a distance between a pair of deflection electrodes.

8. An ink jet printer as claimed in claim 6, wherein the deflection efficiency adjusting means comprises a deflection voltage level adjusting circuit for changing a deflection voltage level which is applied to the deflection electrodes.

9. An ink jet printer as claimed in claim 6, wherein the deflection efficiency adjusting means comprises a charge voltage level adjusting circuit for changing a level of a charge voltage which is applied to the charging electrode.

10. An ink jet printer as claimed in claim 6, wherein the module further comprises a drive efficiency adjusting means for maintaining a drive voltage applied to the ink jet head unit for forming ink drops constant.

11. An ink jet printer as claimed in claim 10, the drive efficiency adjusting means comprises a variable resistor which is connected between a piezoelectric vibrator of the head and a driving circuit which applies the drive voltage to said piezoelectric vibrator.

12. An ink jet printer as claimed in claim 10, wherein the drive efficiency adjusting means comprises a variable capacitor.

13. An ink jet printer as claimed in claim 10, wherein the drive efficiency adjusting means comprises a means for cutting an electrode surface of the piezoelectric vibrator by laser trimming.

14. An ink jet printer as claimed in claim 11, wherein the driving circuit comprises an output level adjusting means for adjusting an output level of the driving circuit such that the drive voltage is maintained at a predetermined reference value.

15. An ink jet printer as claimed in claim 14, wherein the output level adjusting means is built in the driving circuit.

16. An ink jet printer as claimed in claim 14, wherein the output level adjusting means is built in a power source for supplying power to the driving circuit.

* * * * *